Jan. 6, 1942. J. STANITZ Re. 21,997

METHOD OF MAKING SINKS, WASHBASINS, AND THE LIKE

Original Filed Dec. 7, 1932 2 Sheets-Sheet 1

Inventor

Jacques Stanitz

By Frease and Bishop

Attorneys

Jan. 6, 1942. J. STANITZ Re. 21,997

METHOD OF MAKING SINKS, WASHBASINS, AND THE LIKE

Original Filed Dec. 7, 1932 2 Sheets-Sheet 2

Inventor

Jacques Stanitz

By Frease and Bishop

Attorneys

Reissued Jan. 6, 1942 Re. 21,997

UNITED STATES PATENT OFFICE 21,997

METHOD OF MAKING SINKS, WASHBASINS, AND THE LIKE

Jacques Stanitz, Warren, Ohio, assignor, by mesne assignments, to Steel Plumbing Wares, Inc., Detroit, Mich., a corporation of Michigan Original No. 1,916,910, dated July 4, 1933, Serial No. 646,207, December 7, 1932. Application for reissue December 18, 1940, Serial No. 370,733

4 Claims. (Cl. 113—120)

This invention relates to improvements in the process of forming sheet metal into sinks, wash basins and the like, of the type which are provided with a comparatively high back lying in a plane substantially at right angles to the plane of the top of the sink or basin.

By the exercise of my improved process, sinks, wash basins, and the like, can be quickly and cheaply formed from a single piece or blank of sheet metal.

Heretofore, in the forming of such devices from a single piece of sheet metal, difficulty has been encountered in the step of bending the back up into its vertical position. The first step in the manufacture of devices of the kind referred to from sheet metal is the drawing down of the fluid-receiving bowl. This bowl is ordinarily provided with a substantially vertical back wall. Consequently, there is a right angle bend at the upper edge of the wall. It has been found that if the splash-back is bent upwardly to a vertical position at or very near the upper edge of the back wall of this bowl, the metal is likely to be fractured or objectionable bulging or wrinkling may occur. The principal feature of my invention is the provision of a method of manufacture which eliminates this objection.

In the accompanying drawings, I have shown the sink as it appears during the various stages of manufacture. In these drawings—

Figure 1:
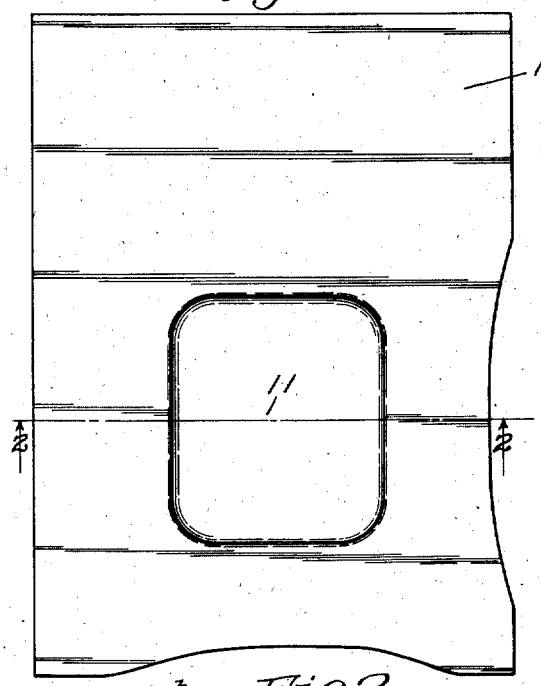
Figure 1 is a top plan view of a blank or sheet of metal from which the sink or basin is formed, showing the fluid-receiving bowl drawn therein.

As shown in the drawings, 10 may indicate a substantially rectangular blank of sheet metal from which the completed sink is to be formed. In Fig. 1, the fluid-receiving bowl 11 is shown as already completely drawn or formed in the blank and is preferably substantially rectangular in shape. The bottom of this bowl is indicated by 11*a* and the back wall thereof by 11*b*.

Figure 3:
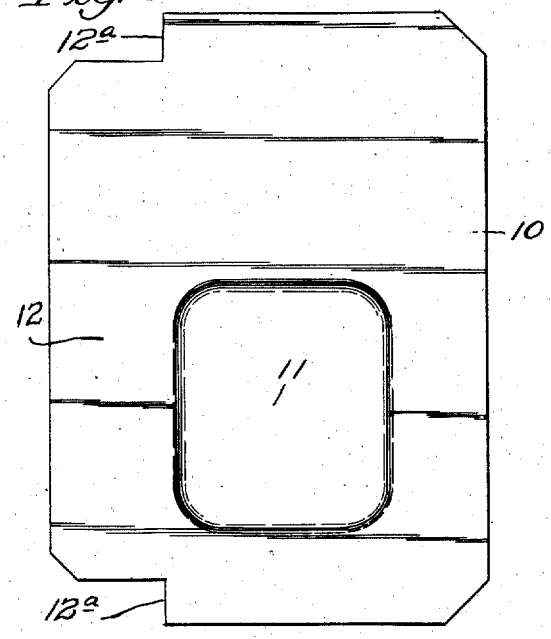
Fig. 3 is a view similar to Fig. 1 showing the blank trimmed for the succeeding operations and also showing in broken lines the location of the lines of bending and of slitting in the subsequent forming operations.
Figure 7:
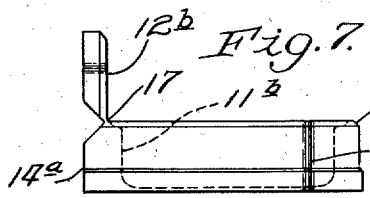
Fig. 7 is a view similar to Fig. 6 showing the back bent upwardly into its vertical position.
Figure 8:
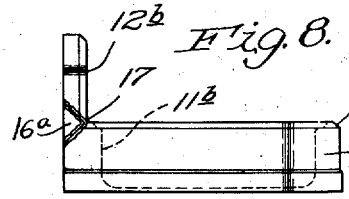
Fig. 8 is a view similar to Fig. 7 showing pieces welded in the flange on the back.
Figure 9:
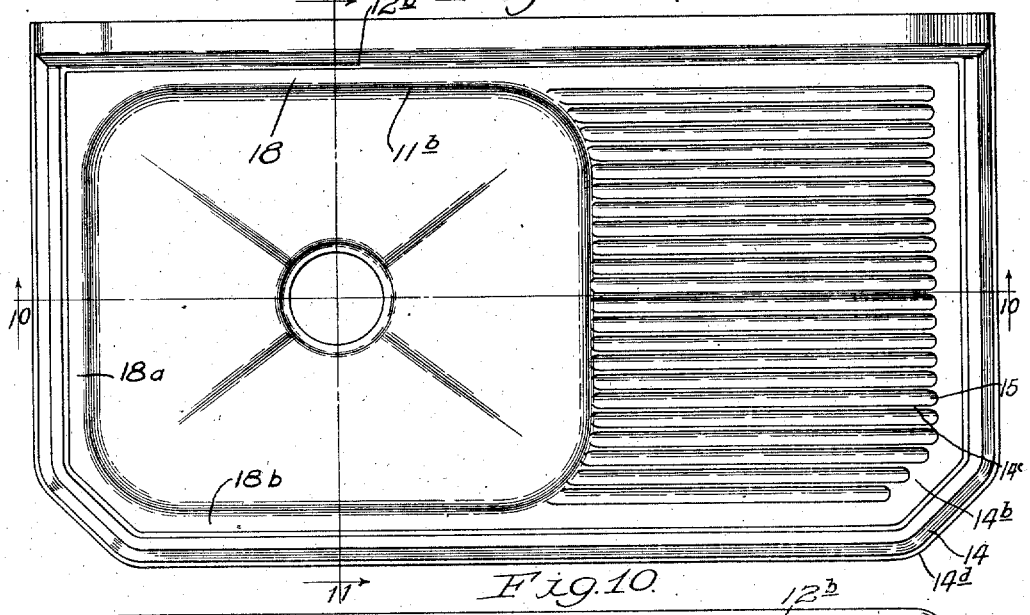
Fig. 9 is a top plan view of the finished sink.
Figure 10:
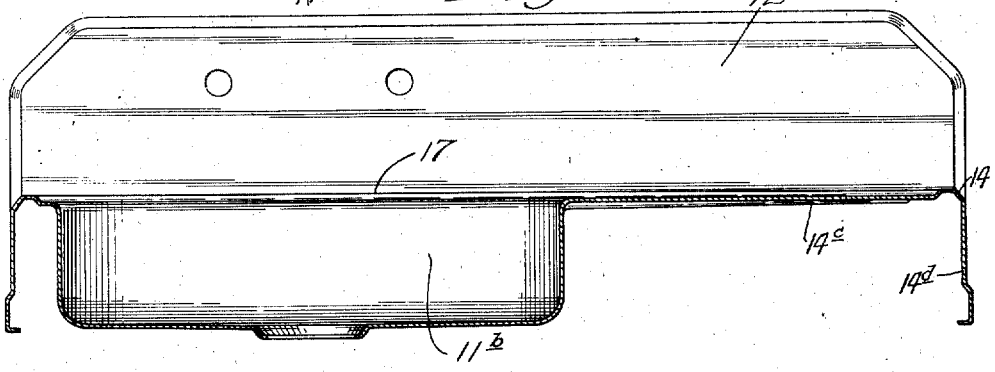
Fig. 10 is a view taken as indicated by the line 10 of Fig. 9.
Figure 11:
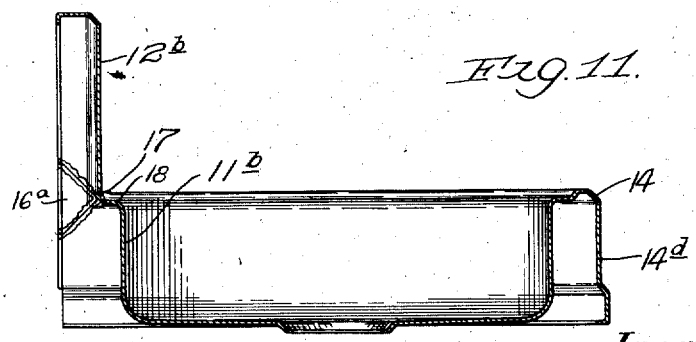
Fig. 11 is a view taken as indicated by the line 11 of Fig. 9.

After the formation of the fluid-receiving bowl, the blank is trimmed as shown in Fig. 3, principally by making the edges straight, beveling the corners, and cutting the notches 12*a*, 12*a* to define the back panel 12 for the splash-back 12*b* and leave sufficient metal for formation of the drainboard, the rim and the apron around the sink, all in the original plane of the blank.

Figure 4:
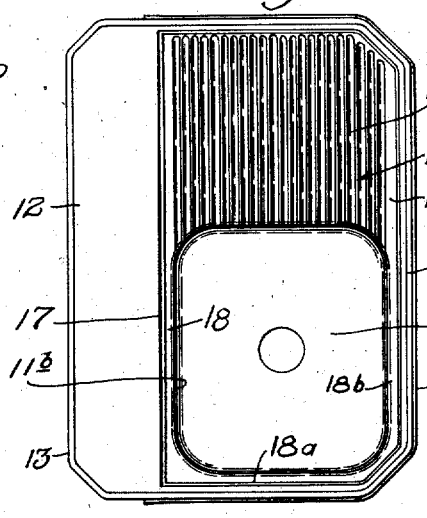
Fig. 4 is a top plan view showing the apron, rim, panels and drain grooves formed and, also, the flange for the back.
Figure 5:
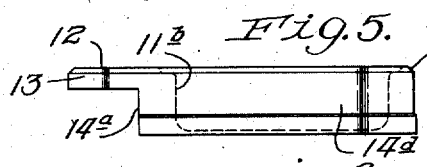
Fig. 5 is an end view of the sink partly formed as shown in Fig. 4.
Figure 2:
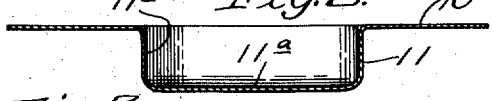
Fig. 2 is a section taken as indicated by the line 2 of Fig. 1.
Figure 6:
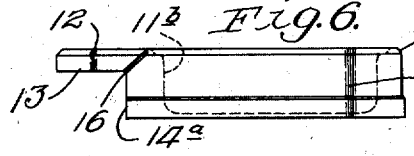
Fig. 6 is a view similar to Fig. 5 showing the slitting of the flanges to permit the bending up of the splash-back.

The sink is then formed as shown in Fig. 4. That is, the depending flange 13 is formed around three sides of the back panel 12, a turned rim 14 which may have a flat top is formed around the front side and ends of the sink, a generally horizontal drain-board and bowl panel 14*b* is formed within the rim, drain grooves 15 may be formed in the drain-board between ribs 14*c*, and the apron or depending flange 14*d* is drawn down around the three sides of the sink. The depending flange 13 at each end of the back panel 12 continues rearward from the depending apron 14 at each end of the drain-board and bowl panel 14*b* as shown in Fig. 5.

The drain-board and bowl panel 14*b* thus formed as shown in Fig. 4, may include a shelf 18 at the rear of the bowl and a similar shelf 18*a* at the end of the bowl opposite the drain grooves 15 and a corresponding shelf 18*b* at the front of the bowl; the drain-board and the shelves are all formed below the plane of the top of the rim 14, as shown after the first forming operation, in Figs. 4, 9, 10 and 11.

It is to be particularly noted, however, that the apron 14*d* extends some distance back of the plane of the back wall 11*b* of the fluid-receiving bowl 11. As shown in Fig. 5, the rear ends of the apron 14*d* are indicated by 14*a*. It will be seen that this lies some distance back of the plane of the wall 11*b*.

And, more important, it is noted that after the forming operations, the metal for the splash-back and the metal for the top of the turned rim are both in the same plane, that is to say, are coplanar.

The flange 13 on the back is then slit, as indicated by 16, where it joins the apron 14*d*. The back panel 12 is then bent up into vertical position on the line 17 to form the splash-back panel 12b with a rearwardly projecting flange 13, which is in the same plane with the depending apron 14d at each end of the sink, and a gusset 16a is then welded by its edges to the edges of the slit 16 to fill the opening between them. It is to be particularly noted that this line 17 lies back of the plane of the back wall 11b of the fluid-receiving bowl. This leaves a shelf 18 back of the fluid-receiving bowl and in front of the splash-back.

If the splash-back panel 12b is bent up on a line lying substantially in the same plane as the back wall 11b of the bowl, there is very likely to be a fracture, bulging or wrinkling of the metal at the line of the bend. When the bowl is formed, a right angle bend is made at the top of the back wall 11b of the bowl. If the back is bent up along this line, this causes a straightening of this bend, which is very likely to either weaken or fracture the metal or cause distortion of the same. By bending the back wall upward along and throughout the length of a longitudinal line 17 lying back of the plane of the back wall 11b, of the bowl in the original plane of the blank and extending along the splash-back and through and across the top of the rim 14 at each end of the sink, this is avoided.

Moreover, it is not necessary to notch or slit the metal at the junction of the splash-back panel 12b with the top of the turned rim 14 to bend the back panel upward, which has heretofore been done, and would necessitate a subsequent welding of the notched or slit metal. This leaves the metal at the junction of the splash-back and the rim free of notching, slitting and welding at this place.

The foregoing detailed description has been given for clearness of understanding only, and no unnecessary limitations should be understood therefrom.

What I regard as new and desire to secure by Letters Patent is:

1. In a method of forming sinks, wash basins and the like with a splash-back from a metal blank, the steps of drawing down an integral sheet of metal to form a substantially rectangular fluid-receiving bowl, leaving sufficient metal in the original plane of the blank to form a splash-back with a flange around three sides at the rear of the bowl and a turned rim with an apron around three sides of the bowl; then forming a flange around three sides of the splash-back and a turned rim with an apron around three sides of the bowl, the flange being coplanar with the apron and the splash-back being coplanar with the top of the rim, at each end of the sink; and then bending the splash-back upward along and throughout the length of a longitudinal line lying back of the plane of the back wall of the bowl and in the plane of the top of the rim and in the original plane of the blank, said line extending along the splash-back and through and across the width of the top of the rim at each end of the sink to form a substantially vertical splash-back.

2. In a method of forming sinks, wash basins and the like with a splash-back from a metal blank, the steps of drawing down an integral sheet of metal to form a substantially rectangular fluid-receiving bowl, leaving sufficient metal in the original plane of the blank to form a splash-back with a flange around three sides at the rear of the bowl and a turned rim with an apron around three sides of the bowl; then forming a flange around three sides of the splash-back and a turned rim with an apron around three sides of the bowl, the flange being coplanar with the apron and the splash-back being coplanar with the top of the rim, at each end of the sink; then slitting the metal between the flange and the apron to but not through the top of the rim; and then bending the splash-back upward along and throughout the length of a longitudinal line lying back of the plane of the back wall of the bowl and in the plane of the top of the rim and in the original plane of the blank, said line extending along the splash-back and through and across the width of the top of the rim at each end of the sink to form a substantially vertical splash-back.

3. In a method of forming sinks, wash basins and the like with a splash-back, from a metal blank, the steps of drawing down an integral sheet of metal to form a substantially rectangular fluid-receiving bowl, leaving sufficient metal in the original plane of the blank to form a splash-back with a flange around three sides at the rear of the bowl, a drainboard at one end of the bowl, and a turned rim with an apron around three sides of the bowl; then forming a flange around three sides of the splansh-back and forming a drainboard at one end of the bowl with a turned rim and an apron around three sides of the drainboard and bowl, the flange being coplanar with the apron and the splash-back being coplanar with the top of the rim, at each end of the sink; and then bending the splash-back upward along and throughout the length of a longitudinal line lying back of the plane of the back wall of the bowl and in the plane of the top of the rim and in the original plane of the blank, said line extending along the splash-back and through and across the width of the top of the rim at each end of the sink to form a substantially vertical splash-back.

4. In a method of forming sinks, wash basins and the like with a splash-back, from a metal blank, the steps of drawing down an integral sheet of metal to form a substantially rectangular fluid-receiving bowl, leaving sufficient metal in the original plane of the blank to form a splash-back with a flange around three sides at the rear of the bowl, a drainboard at one end of the bowl, and a turned rim with an apron around three sides of the bowl; then forming a flange around three sides of the splash-back and forming a drainboard at one end of the bowl with a turned rim and an apron around three sides of the drainboard and bowl, the flange being coplanar with the apron and the splash-back being coplanar with the top of the rim, at each end of the sink; then slitting the metal between the flange and the apron to but not through the top of the rim; and then bending the splash-back upward along and throughout the length of a longitudinal line lying back of the plane of the back wall of the bowl and in the plane of the top of the rim and in the original plane of the blank, said line extending along the splash-back and through and across the width of the top of the rim at each end of the sink to form a substantially vertical splash-back.

JACQUES STANITZ.